(12) United States Patent
Randall (10) Patent No.: US 6,414,230 B2
(45) Date of Patent: Jul. 2, 2002

(54) JAZZ DRUMMING RIDE PATTERN FLIP CHART TOOL

(76) Inventor: Ben H. Randall, 11 Los Amigos Ct., Orinda, CA (US) 94563

( * ) Notice: Subject to any disclaimer, the term of this patent is extended or adjusted under 35 U.S.C. 154(b) by 0 days.

(21) Appl. No.: 09/755,213

(22) Filed: Jan. 5, 2001

Related U.S. Application Data (60) Provisional application No. 60/175,134, filed on Jan. 7, 2000.

(51) Int. Cl.[7] ............................................. G09B 15/00
(52) U.S. Cl. ...................... 84/470 R; 84/471 R; 84/472
(58) Field of Search .......................... 84/470 R, 471 R, 84/472, 477 R (56) References Cited

U.S. PATENT DOCUMENTS

| | | | | |
|---|---|---|---|---|
| 1,666,382 A | * | 4/1928 | Hoffmeister | |
| 2,944,349 A | * | 7/1960 | Kaufman | |
| 3,247,751 A | * | 4/1966 | Leonard | |
| 4,128,037 A | | 12/1978 | Montemurro | 84/476 |
| 4,464,971 A | * | 8/1984 | Dean | |
| 5,597,968 A | | 1/1997 | Okamoto | 84/470 |

FOREIGN PATENT DOCUMENTS

CH 616016 * 2/1980

* cited by examiner

Primary Examiner—Shih-Yung Hsieh
(74) Attorney, Agent, or Firm—Robert Charles Hill (57) ABSTRACT

A jazz drumming ride pattern flip chart tool comprises at least one ride pattern card and a notation card beneath and extending beyond the ride pattern card. A sliding dowel moved to a place on the notation card indicates which drum should be struck. Each sliding dowel is positioned horizontally exactly the same distance apart as the space between the notes on the card directly above. A disk is at the top of each dowel with "R" on one side and "L" on the other side.

7 Claims, 8 Drawing Sheets

JAZZ DRUMMING RIDE PATTERN FLIP CHART TOOL

This application claims benefit of Prov. No. 60/175,134 filed Jan. 7, 2000.

FIELD OF THE INVENTION

This invention consists of a tool that aids drum-set instructors in teaching drummers to play in the Jazz/Swing idiom. A teacher who instructs drum-set players to play in this idiom must encourage the drummer to read drum notation, master the coordinated physical movements dictated by the written exercises, and to correctly interpret those written exercises by playing them with a "swing" feel. The present invention provides a tool designed to help the student to read drum notation and teach the drum-set musician to develop the coordination required to interpret 4-way drum-set exercises, and to play with a "swinging" feel as well. Until this invention, no single tool could provide guidance in all three of these disciplines.

BACKGROUND OF THE INVENTION

While teaching drum-set drummers to play in the Jazz/Swing idiom I discovered that the students experienced difficulty in three specific areas: Reading drum notation, practicing complex exercises slowly, and interpreting the written notation by playing them with a "jazz" feel.

First, many of the drummers had begun playing without benefit of formal lessons and accordingly had no knowledge of drum-set notation. They could not sight read or interpret the written exercises and had to memorize the patterns. The students could play drums in a band but could not read music. The present invention presents the written notes in a measured visual format in which the physical spaces between the written notes are directly related to the time-measurements between the notes as they are played.

Second, the students generally attempted to play the assigned exercises at too fast a tempo. This resulted in incorrect and uneven playing. It was difficult to persuade the student to slow down and learn to play the exercise correctly before increasing the speed. The present invention presents its notation in such a large format that the student is forced to scan the individual notes with deliberate eye movement enforcing the need to play the annotated patterns slowly.

Third, many students who had learned to play in the style of Rock music (straight $8^{th}$ and straight $16^{th}$ time) had difficulty in feeling the more relaxed Jazz/Swing pulse (triplet-feel 12/8 time). The student's performance sounded rigid and stiff as opposed to flexible and flowing. The difference was between sensing rhythm in 4 pulses per beat against 3 pulses per beat. The present invention n juxtapositions the two styles adjacent to one another and makes visible the spatial relationships between them. The present invention clearly presents a method of playing and hearing both time pulses enabling the student to hear as well as see the difference between four pulses per beat and 3 pulses per beat.

CONCISE EXPLANATION OF PRIOR ART OF PRIOR ART

U.S. Pat. No. 4,128,037 describes an apparatus that uses a series of symbols inscribed on movable tiles. The device includes an array of tiles arranged within a frame. Each tile bears a symbol indicating the type of percussive stroke, the drum to be struck and possibly an indication of how many strokes are to be made in sequence. The tiles may be moved and rearranged in any desired order to enable the drummer to play different patterns of rhythmic sounds.

U.S. Pat. No. 5,597,968 describes a limited selection of percussion exercises and variations accompanied by pre-printed transparent overlays that can be superimposed over the basic notation creating hybrid patterns. The overlays may be alternately superimposed in a functional relationship with the basic percussion exercises to create hybrid percussion exercises having adequate visual representation of the repetitive rhythmic patterns inherent in percussion music.

Neither of the devices enable individual left hand notes to be variably positioned against repeated right hand patterns. U.S. Pat. No. 4,128,037 uses non-standard symbols to indicate how the drum is to be struck unlike the present invention which enables the student to build a left hand pattern using individual notes, building slowly from the simple to the complex. U.S. Pat. No. 5,597,968 uses transparent overlays which are marked up with a felt pen by the teacher. Individual notes are presented in the normal notation size in contrast to the present invention. The present invention provides the notes in a large-scale format encouraging the student to play the pattern slowly at first . . . and enables the student to move different notes to different drums. Notes can be moved or added as the student masters the original exercise. By flipping down different right hand patterns the student can quickly display the same left hand rhythm against several different right hand patterns.

BRIEF DESCRIPTION OF THE INVENTION

The drum-set student is required to gain an understanding of drum notation in order to learn from the available texts. The available texts are for the most part inflexible and rely on repetitive patterns with small incremental shifts in the pulse to reveal the subtle changes in the percussive patterns. A problem with these texts is that the drum-set student must develop a practice method that encompasses mechanical movement, repetitive practice and musical interpretation without benefit of a tool that focuses specifically on enforcing these disciplines.

The instant invention presents a variety of right hand "ride" patterns in drum set notation to the student in large inch-high characters on a flip-down card attached to the backing with a spiral binding. Inscribed on a 3½"×11½" card flip down page, a single measure occupies a space between 9" and 11" inches wide depending upon the type of pattern. Positioned below the flip down card are 16 sliding vertical dowels with disk-shaped note heads attached to their tops. Each dowel represents a note to be played depending upon which drum line the note is positioned . Each sliding bar is located exactly the same distance apart as space between the notes on the flip-down card directly above. This enables the teacher to indicate which drum should be struck by sliding the bar up and positioning the note head. The left hand or right foot (depending upon the vertical position of the sliding note-head) can play the note. The teacher can indicate high tom, snare, low tom or bass drum by sliding the tab up or down. In this manner many different two hand—one foot patterns can be represented.

The concept of playing slowly and carefully is re-enforced.

The size of the notes and the relatively wide-spaces initially prompt the student to play the right hand exercise slowly.

The time concepts surrounding the reading of drum notation are realized.

Drum notation commonly reserves the space above the treble clef scale for the right hand cymbal pattern. The present invention uses half-page, spiral-bound cards to contain this notation. Each half-page is inscribed with a different right hand ride pattern positioned above five notation lines. The half pages are attached to the main card body with spiral binding. The half pages are flipped from the back of the card body to the front and overlay the upper half of the page. A new pattern is displayed as each page is turned back to front. Patterns on each page represent different right-hand rhythms drawn to the same spacing specification, with each note separated from the next by ⅝ths of an inch.

The lower half of the card body is composed of vertically sliding dowels, ⅝ths of an inch apart, each topped with a flexible circular disk that represents a note. The sliding dowel or the disk alone implies no time notation. When the sliding dowel is vertically positioned under a note or rest that appears on the upper half of the page the drum-set student can see that the drum can be struck with the left hand in a time pulse identical to the visualized space between the notes. A left hand note positioned exactly between two right hand notes would be played evenly between the three of them. This space-time relationship is adhered to throughout the operation of the invention. The notes are positioned horizontally in exactly the same space relationship as the time pulse they represent. This visual relationship enhances the student's understanding of the aural spacing of the note. The note spacing looks like it sounds.

The concepts of Swing are presented visually.

Both the $8^{th}$ note, $16^{th}$ note and triplet forms of the swing ride pattern are presented. The close relationship between the spatial and aural timing of the notes is presented clearly and simply to the student. The student can both see and hear the effect of applying the triplet 12/8 swing feel or the straight $8^{th}$ or $16^{th}$ feel to the style of play.

Specific resolutions to three of the problems experienced by the drum-set instructor teaching jazz drumming are presented by use of the present invention. The size of the device caused the student to play slowly. The time-space relationship of the notation encourages the student to correctly interpret and play drum notation. The juxtaposition of $8^{th}$ and $16^{th}$ note notation with 12/8 triplet notation reveals important clues to the concept of the syncopated jazz pulse known as "swing". The unique design of the invention affords the drum-set instructor with an important and effective teaching aid.

BRIEF DESCRIPTION OF THE DRAWINGS

FIG. 8 shows the fifth group of 2 flip right hand patterns and a 12/8 form notation card.

DETAILED DESCRIPTION OF THE INVENTION

Figure 1:
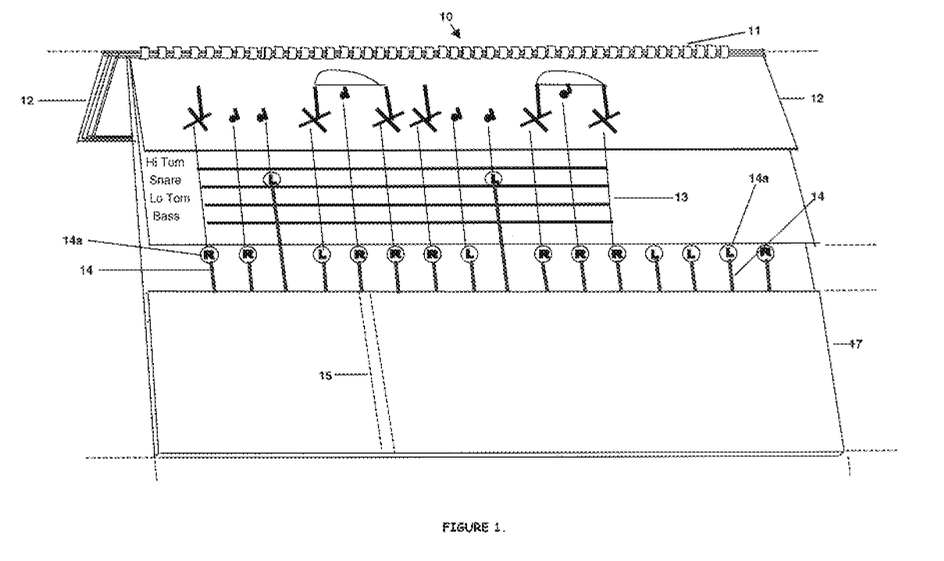
FIG. 1 is a front perspective view of the present invention.

Referring to FIG. 1, the Jazz Drumming Ride Pattern Flip Chart Tool, generally indicated 10, presents a variety of right hand "ride" patterns in drum set notation to the student in a large characters on a flip-down ride pattern card—attached to the backing with a spiral binding 11. Typically twenty to twenty-five ride pattern cards 12, can be attached to the backing by the spiral binding 11. Inscribed on each of the 3½"×11½" flip-down ride pattern cards 12 is a single measure pattern, which occupies a space 11" inches wide by 4" deep. A longer notation card 13 measuring 11" wide by 6" deep is positioned beneath the pattern cards 12. Each line on the notation card 13 is labeled with the name of the drum to be played: Hi Tom, Snare, Lo Tom, Bass—which matches standard drumming notation. Positioned below the pattern cards are 16 sliding vertical dowels 14, with disks 14a atop the dowel 14 representing notes attached to the top of each dowel. Letters "L" representing "left" or "R" representing "right" are written on opposite sides of the disk. The disk 14a atop the dowel 14 can be flipped exposing either the "L" or the "R". The disk 14a at the top of each dowel 14 represents a note to be played with either hand depending on which letter is exposed. Each sliding dowel 14 is positioned horizontally exactly the same distance apart as the space between the notes on the flip-down pattern card 12 directly above. The dowels 14 reside inside plastic tubes 15 that grip the dowel allowing smooth up and down movement.

Figure 2:
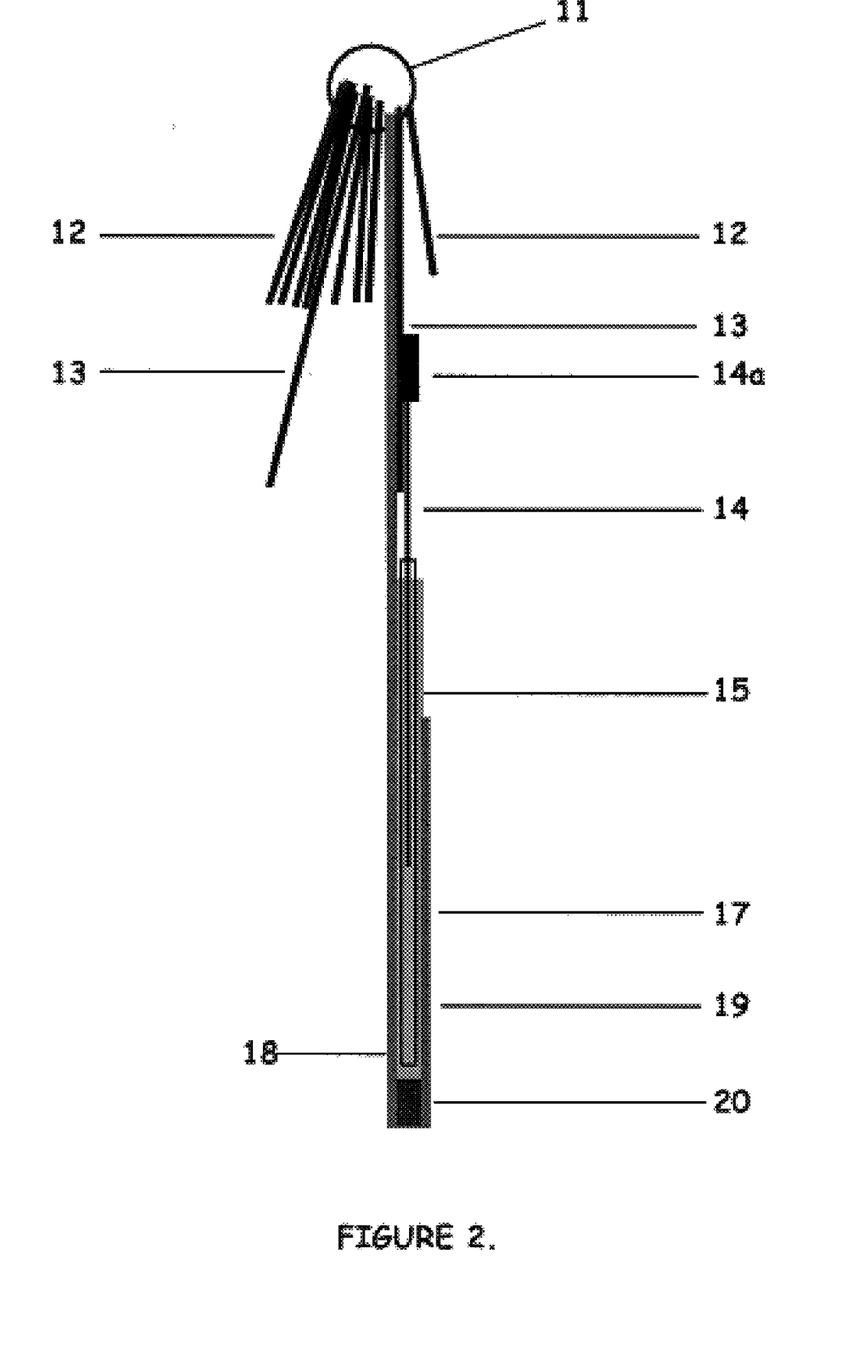
FIG. 2 is a side view of the present invention showing the spiral attached flip cards.

By moving the dowel 14 over the top of the notation card 13, inscribed with the ride pattern 12, the note head or disk 14a can be positioned to indicate that one of four drums should be struck. The left hand can play the note on one of three drums or by right foot on the bass drum (depending upon the vertical position of the sliding dowel). The teacher can choose to indicate the high tom, snare, low tom or bass drum by sliding the dowel up or down. In this manner many different hands-feet combination patterns can be represented. A protective cover 17 encases the tubes 15 containing the sliding dowels 14. As shown in FIG. 2, all of the components are attached to a plastic backing 18. The tubes 15 alternate with vertical strips of rubber spacers 19 (FIG. 2) that also trim the horizontal bottom edge of the backing.

FIG. 2 is a side view of the present invention. The spiral binding 11 attaches to the top of the plastic backing 18 and holds the pattern-cards 12. A drum notation card 13 flips down to form the backing for the sliding dowel-notes 14. Several components are sandwiched against the backing 18. 17 Rubber spacers 19 separate the plastic tubes 15 with a single rubber spacer 20 trimming the bottom of the card. A protective plastic rectangle 17 cover is glued over the tubes and spacers. The flip cards 12 rotate back to front displaying new right-hand patterns. The sliding notes or disks 14a slide vertically to enable them to be individually positioned over the drum notation cards 13.

Figure 3:
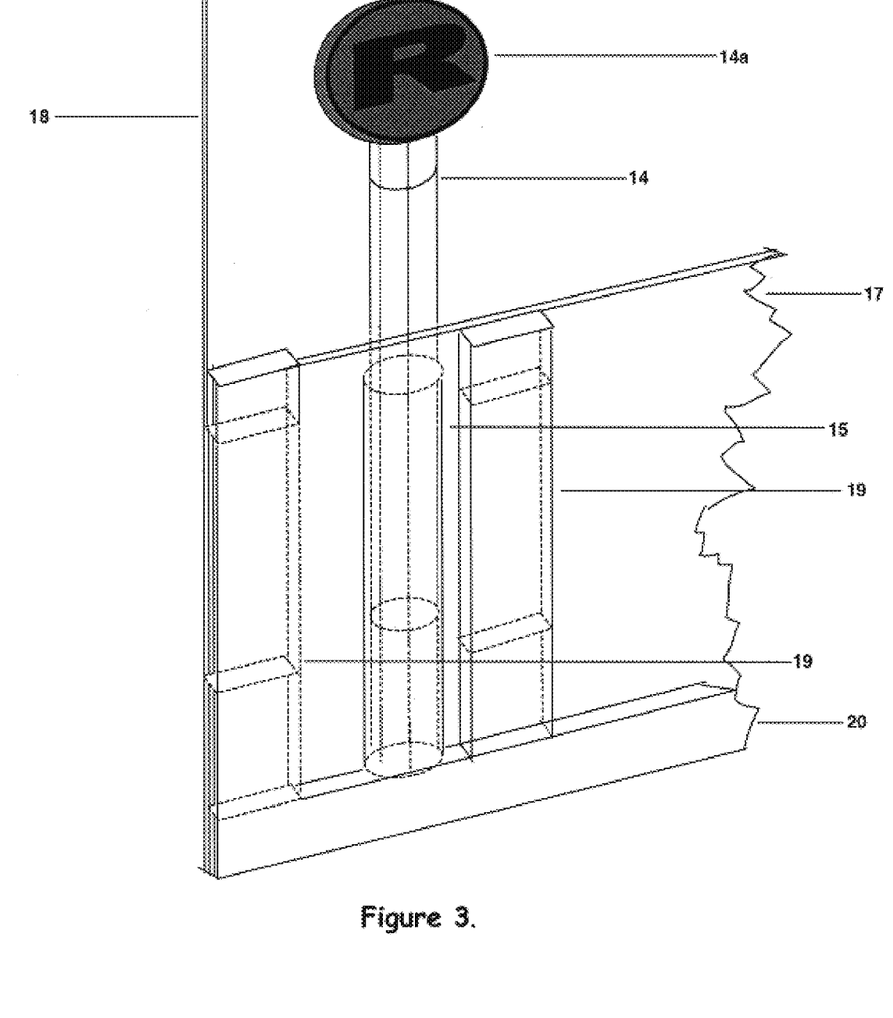
FIG. 3 shows a sliding dowel partially within a tube.

FIG. 3, shows a detailed view of the sliding note and it's mounting method. The note head 14a is attached to the sliding dowel 14. The dowel 14 is encased in a plastic tube 15 in a manner that allows it to slide up and down vertically. The tubes 15 containing the sliding dowel 14 are glued to the backing 18. Rubber spacers 19 separate the tubes 15 and line the bottom of the device 20. A plastic cover 17 seals the array of tubes and spacers.

Figure 4:
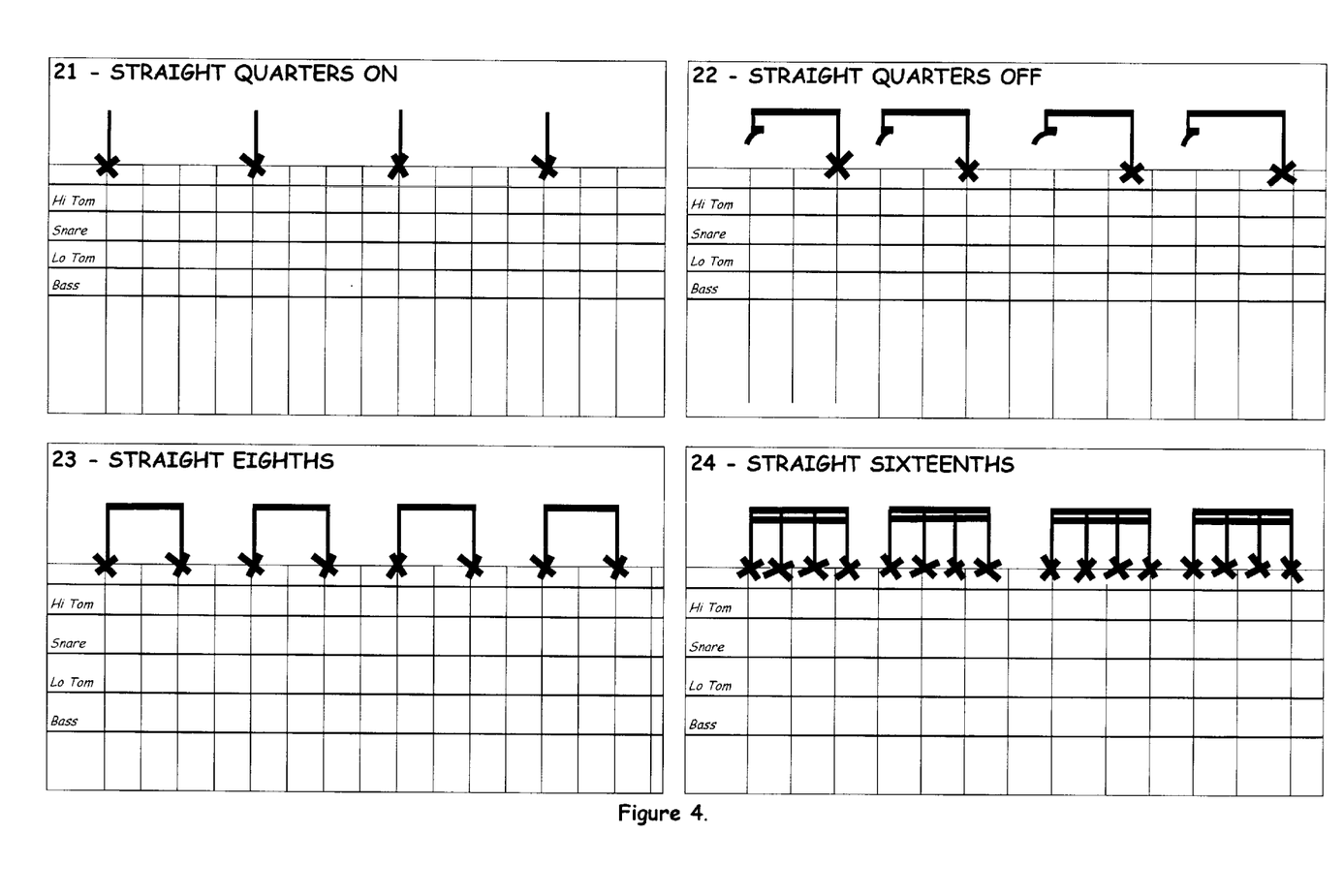
FIG. 4 shows the first group of 4 flip card right hand patterns above a notation card.

FIG. 4 shows the first group of four flip cards containing right hand ostinato patterns: straight quarter notes on the beat 21, straight quarter notes off the beat 22, straight eighth notes 23, and straight sixteenth notes 24.

Figure 5:
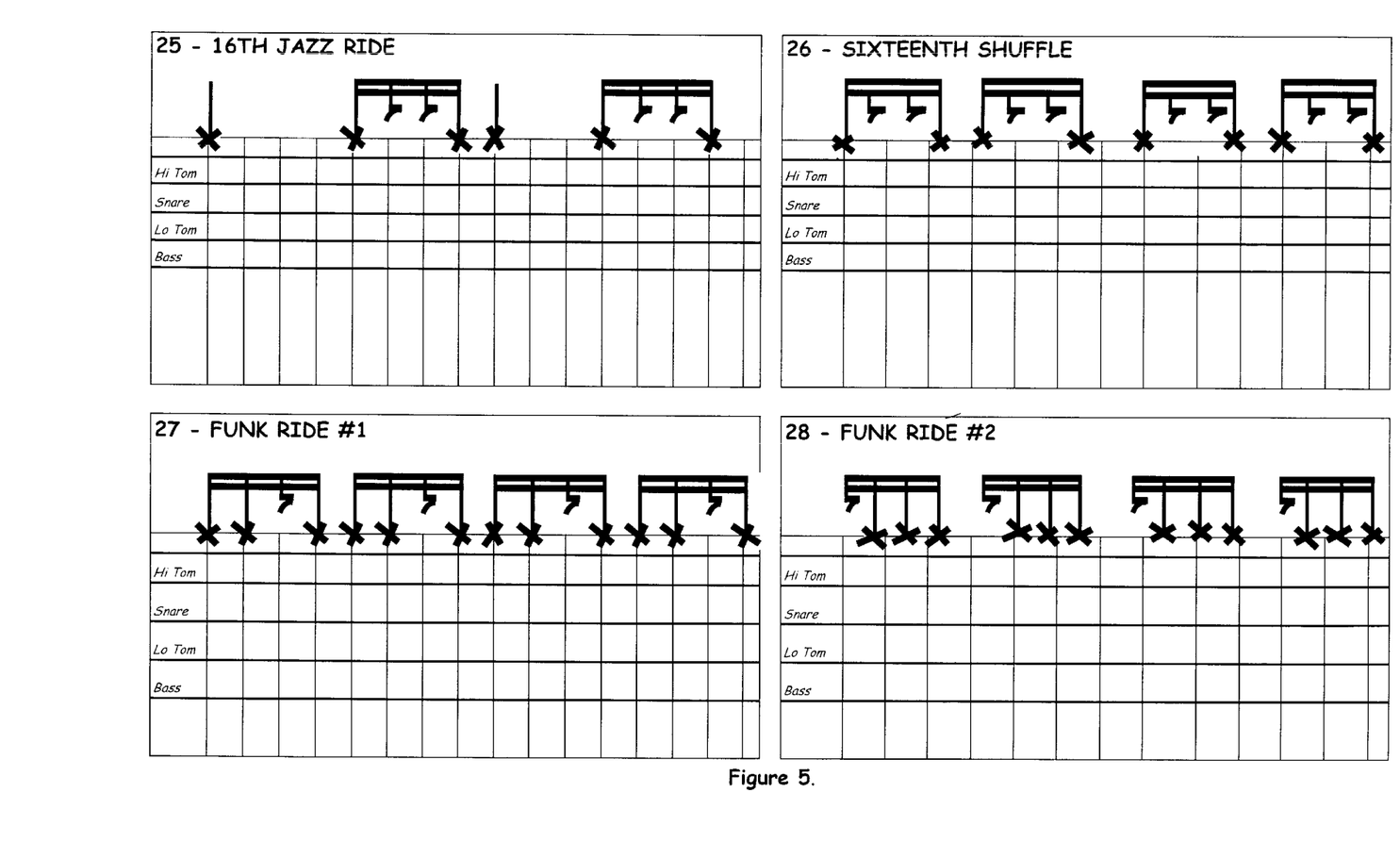
FIG. 5 shows the second group of 4 flip card right hand patterns above a notation card.

FIG. 5 shows the second group of four flip cards containing right hand ostinato patterns: the jazz ride pattern based on sixteenth notes 25, a shuffle pattern based on sixteenth notes 26, funk ride pattern number one 27, and funk ride pattern number two 28.

Figure 6:
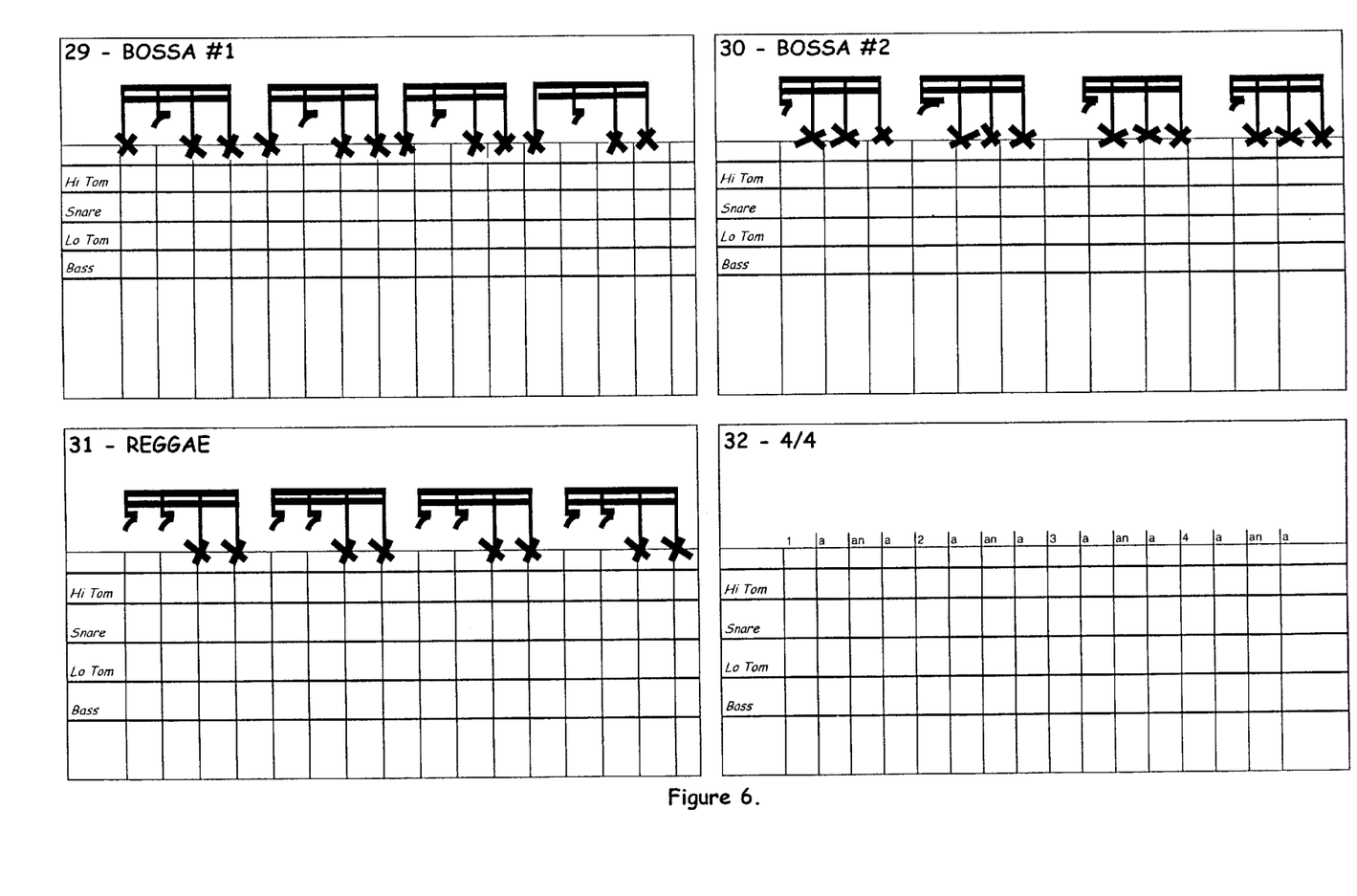
FIG. 6 shows the third group of 3 flip card right hand patterns and a 4/4 form notation card.

FIG. 6 shows the third group of three flip cards containing right hand ostinato patterns: A Bossa Nova pattern number one 29, a Bossa Nova pattern number two 30, and a Reggae pattern 31. A 4/4 notation card 32 is provided so that the drummer can create two handed fill patterns by positioning the sliding notes and flipping the disks to display R or L for right or left hand use.

Figure 7:
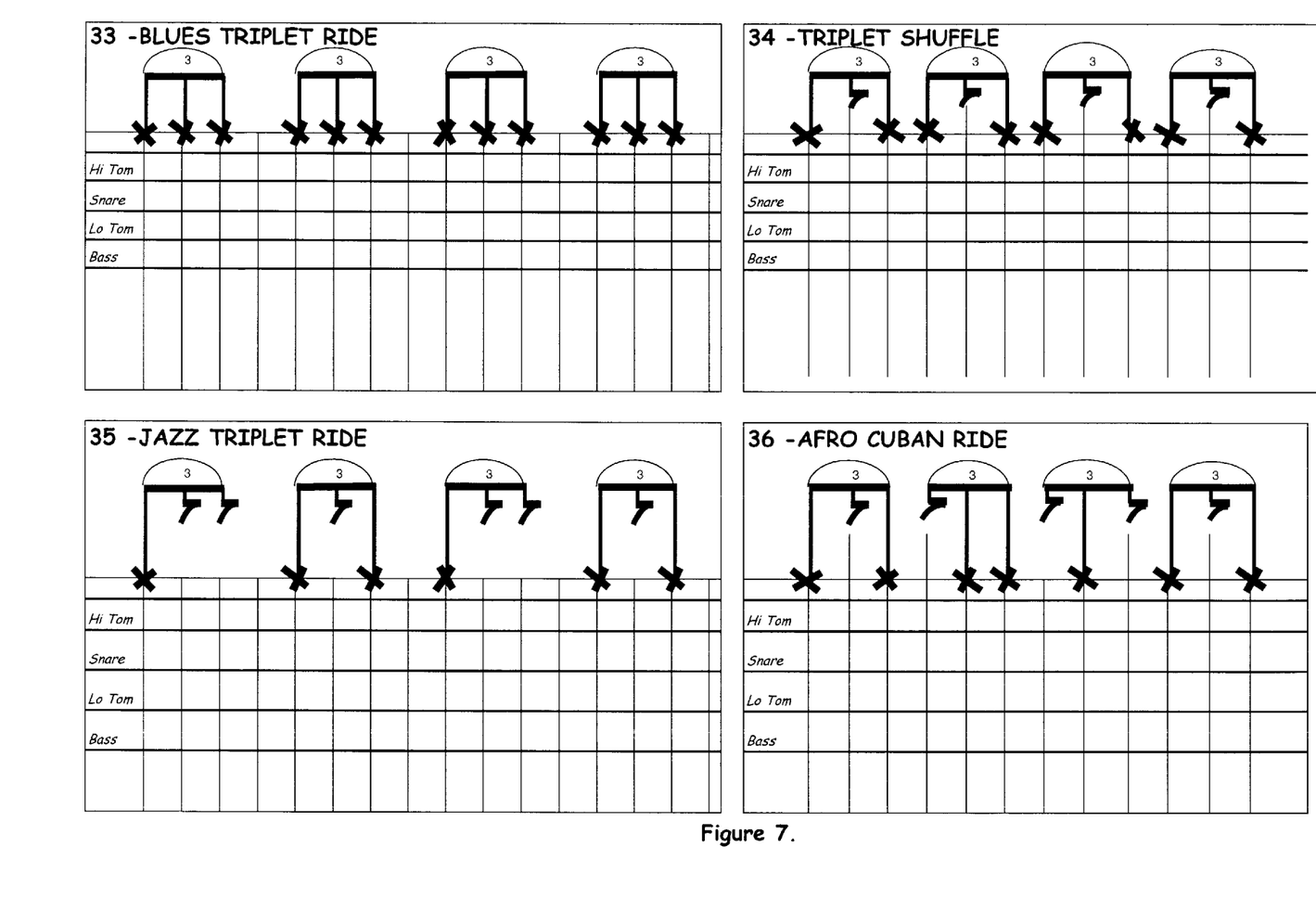
FIG. 7 shows the fourth group of 4 flip card right hand patterns above a notation card.

FIG. 7 shows the first four right hand ostinato based on triplets (three pulses per beat): A blues triplet ride pattern 33, a triplet shuffle 34, the jazz triplet ride pattern 35, and an Afro Cuban ride pattern 36.

FIG. 8 shows two right hand ostinato patterns based on triplets: front fill to jazz triplet ride 37, and jazz triplet ride to back fill 38. A 12/8 notation card 39 is provided so that the drummer can create two handed fill patterns by positioning the sliding notes and flipping the disks to display R or L for right or left hand use.

Although particular embodiments of the present invention have been described and illustrated, such is not intended to limit the invention. Modifications and changes will no doubt become apparent to those skilled in the art and it is intended that the invention only be limited by the scope of the appended claims.

I claim:

1. A plastic flip chart with movable notes consisting of:

several cards inscribed with drum rhythms that are attached to a plastic form topped with spiral binding that allows each card to be flipped from back to front and, said cards directly positioned above a number of vertically oriented sliding dowels, each dowels topped with a raised rubber disk giving the appearance of a note that is positioned on one of several horizontal bar lines, that are inscribed on the flipped-down cards, enabling a drum-set drummer to interpret the resulting pattern and play one of a wide variety of drum-set ride patterns rhythms.

2. A jazz drumming ride pattern flip chart tool, comprising:

at least one pattern card; having notes thereon;

a notation card beneath and extending beyond said pattern card listing the names of a plurality of drums;

at least one sliding dowel having a disk at the top thereof;

wherein, movement of said disk to a place on said notation card indicates which drum should be struck.

3. The flip chart tool of claim 2 wherein the pattern cards and the notation card are attached to a spiral binding.

4. The flip chart tool of claim 3 wherein said dowel slides within a tube.

5. The flip chart tool of claim 2 wherein each said sliding dowel is positioned horizontally exactly the same distance apart as the space between the notes on the pattern card directly above.

6. The flip chart tool of claim 2 wherein said disk can be turned over.

7. The flip cart tool of claim 6 wherein said disk has "R" on one side and "L" on the other side.

* * * * *